United States Patent [19]
McKenzie et al.

[11] Patent Number: 5,424,885
[45] Date of Patent: Jun. 13, 1995

[54] METHOD FOR FOLLOWING DATA TRACKS IN A DISC DRIVE USING AN IMPROVED THERMAL CALIBRATION METHOD

[75] Inventors: Lealon R. McKenzie, Edmond; John E. Moon, Oklahoma City; Paul M. Quinnett, Yukon, all of Okla.

[73] Assignee: Seagate Technology, Inc., Scotts Valley, Calif.

[21] Appl. No.: 2,614

[22] Filed: Jan. 11, 1993

[51] Int. Cl.⁶ .............................................. G11B 5/596
[52] U.S. Cl. ................... 360/77.05; 360/77.04; 360/77.06; 360/77.02
[58] Field of Search ............... 360/77.08, 77.04, 77.05, 360/75, 77.02, 77.06, 77.07, 77.11

[56] References Cited

U.S. PATENT DOCUMENTS

| | | | |
|---|---|---|---|
| Re. 32,075 | 1/1986 | Harrison et al. | 360/77 |
| 3,994,016 | 11/1976 | Moghadam | 360/77 |
| 4,136,365 | 1/1979 | Chick et al. | 360/78 |
| 4,149,199 | 4/1979 | Chick et al. | 360/77 |
| 4,371,960 | 2/1983 | Kroiss | 369/43 |
| 4,594,622 | 6/1986 | Wallis | 360/77 |
| 4,630,190 | 12/1986 | Alaimo et al. | 364/167 |
| 4,764,914 | 8/1988 | Estes et al. | 369/58 |
| 4,890,172 | 12/1989 | Watt et al. | 360/77.04 |
| 5,185,681 | 2/1993 | Volz et al. | 360/77.07 |

Primary Examiner—Aristotelis Psitos
Assistant Examiner—Varsha A. Kapadia
Attorney, Agent, or Firm—Edward P. Heller, III; Bill D. McCarthy; Louis W. Watson

[57] ABSTRACT

A method for following data tracks on data surfaces of a disc drive by organizing the data tracks in concentric cylinders including servo tracks on a dedicated servo surface and following servo tracks with a servo transducer that is offset from the servo track to align selected data transducers with the data tracks. To measure the offset for each data surface, a calibration correction track is written to one data surface while a track on the servo surface is followed and the correction track is read by a thermal calibration circuit while following the servo track with an offset to obtain a calibration correction indicative of electronic offsets in the thermal calibration circuit. A pre-written thermal calibration track on each data surface is subsequently read while following a servo track in the same cylinder as the calibration tracks to determine, for each data surface, offsets from the servo tracks which, when adjusted with the calibration correction, will result in data track following by the data transducers. During reading and writing to a data track on a data surface, the data track is followed without offset by following the servo track in the same cylinder as the data track with the corrected offset.

4 Claims, 8 Drawing Sheets

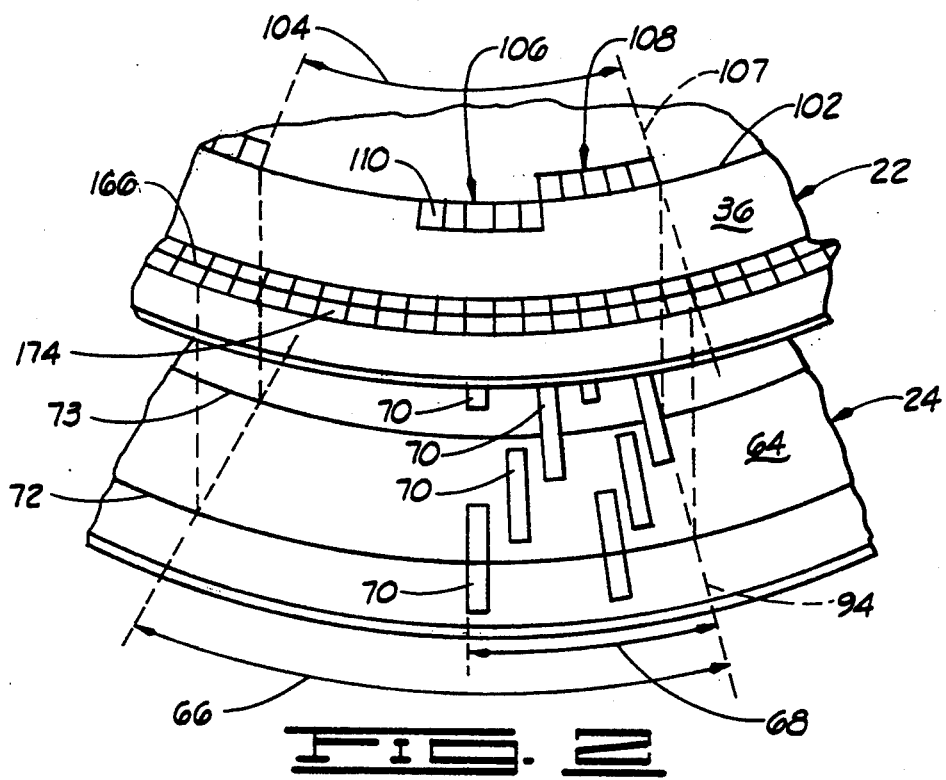
FIG. 2
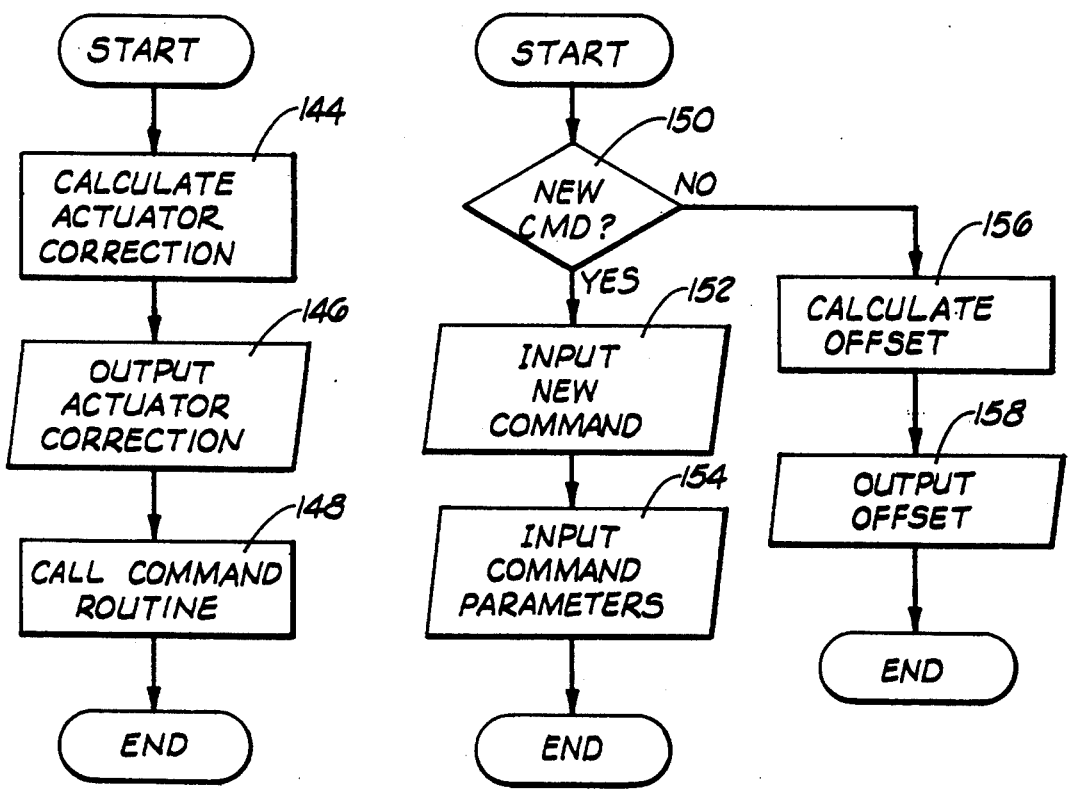
FIG. 5
PRIOR ART
FIG. 6
PRIOR ART

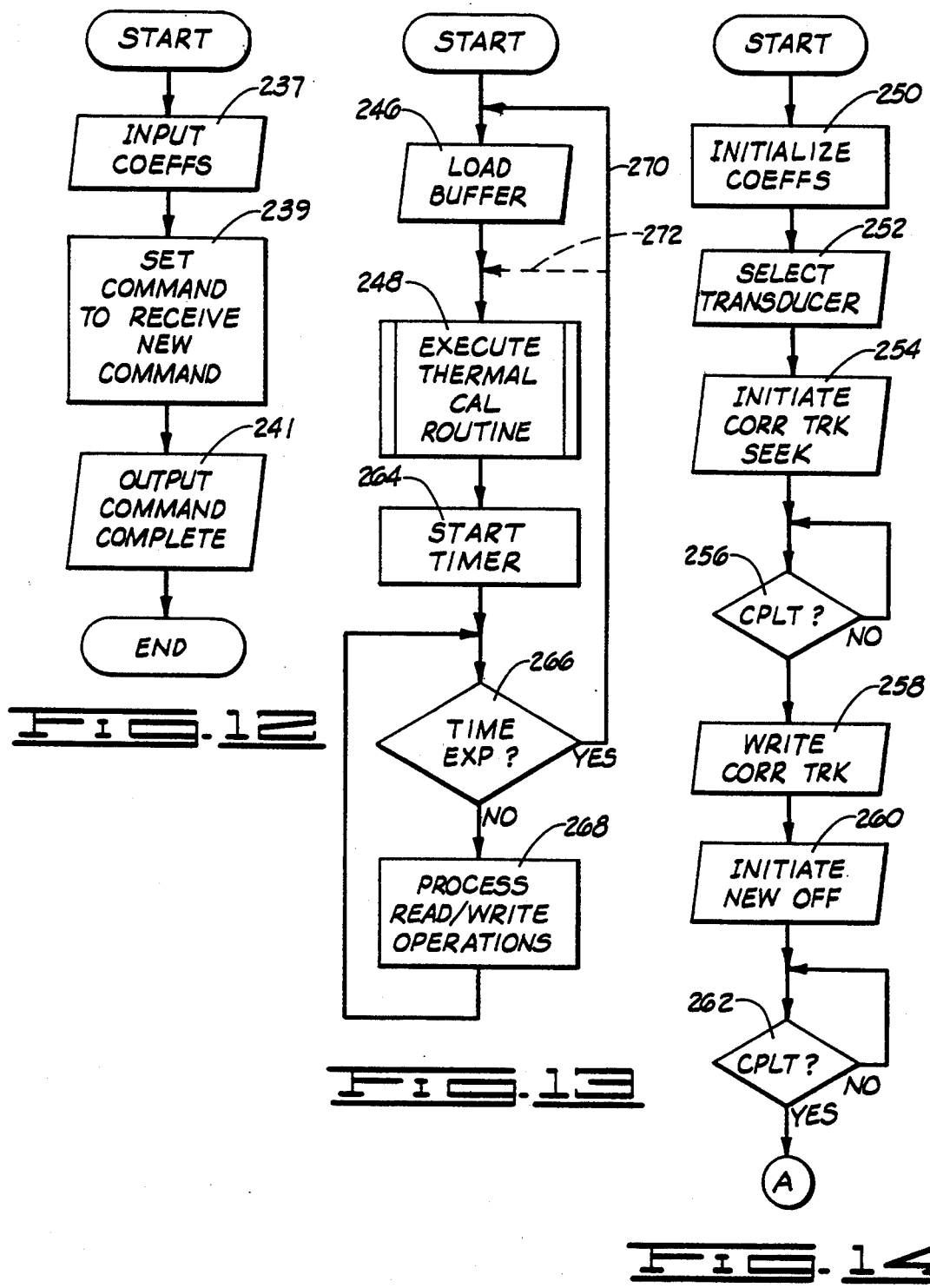

METHOD FOR FOLLOWING DATA TRACKS IN A DISC DRIVE USING AN IMPROVED THERMAL CALIBRATION METHOD

BACKGROUND OF THE INVENTION

1. Field of the Invention

The present invention relates generally to improvements in track following methods in disc drives, and, more particularly, but not by way of limitation to improvements in thermal calibration of offsets of a servo transducer from servo tracks on a dedicated servo surface to align data transducers with data tracks on data surfaces on which computer files are stored.

2. Brief Description of the Prior Art

In hard disc drives having a plurality of stacked, rotating discs for storage and retrieval of computer files, the files are stored along concentric data tracks on the surfaces of the discs using data transducers proximate the disc surfaces to write the files and, subsequently, to read them. In order that a file, once written, can be retrieved, records are maintained of the tracks and disc surfaces to which the file is written and the disc drive is comprised of a transducer select logic circuit that selects one of the data transducers for writing the file and a servo system that is used to radially position the data transducers, as a group, for selection of data tracks on the surface that is to receive the file. Thus, once a file has been stored, it can be retrieved by moving the transducers to the selected track and reading the file using the transducer that was used to write it.

To control the radial position of the transducers, the transducers are mounted on an electromechanical actuator and servo patterns, written to at least one of the disc surfaces, are sampled by the servo system to obtain transducer position information from which actuator correction signals can be generated and transmitted to the actuator to reposition the actuator and thereby maintain radial alignment between the transducers and tracks to which a file is to be written or from which a file is to be read while the servo patterns may be embedded in the files, a more common approach in disc drives that include a plurality of discs is to use one disc surface as a dedicated servo surface, to which the servo patterns are written during manufacture of the disc drives, and use the mounting of the transducers on a common actuator to position the data transducers by positioning the servo transducer, the transducer proximate the dedicated servo surface, to follow servo tracks defined by the servo pattern on the servo surface. To this end, the data tracks on separate disc surfaces are organized into cylinders, each of which includes a servo track on the servo surface, and control of the radial positions of the transducers is effected on a cylinder basis. Since, only one disc surface need contain servo patterns in the case in which a dedicated servo surface is used, a net gain in disc drive storage capacity can often be achieved when the disc drive is comprised of a plurality of discs. Specifically, the elimination of servo patterns on the remaining surfaces; that is, the data surfaces, more than compensates for the loss of availability of the dedicated servo surface for the storage of files.

While the use of a dedicated servo system can thus increase the data storage capacity of a disc drive, it can also give rise to a limitation on the storage capacity. As will be clear to those of skill in the art, the data storage capacity of a disc drive depends upon the spacing of data tracks on the disc surfaces; the more closely the tracks are spaced, the larger the number of tracks that can be made available for the storage of data. However, as the track spacing is reduced, misalignments between the servo transducer and the data transducers and between the servo tracks and data tracks that would be negligible for a larger track spacing can result in sufficient misalignment between a data transducer and data tracks on the data surface proximate the data transducer that a file might be written to or read from the wrong data track if writing or reading takes place while the servo transducer is following a servo track. In the absence of some means for compensating for such misalignments, which can vary with the temperature of the disc stack and actuator, the density of tracks would have to be limited to a value such that the track spacing would be large in relation to any misalignments in the transducers and tracks that might occur.

Since limitation on the track density will unduly limit the data storage capacity of a disc drive, it is common practice to provide disc drives with a capability for following servo tracks with an offset that can be employed to compensate for the misalignments. To this end, a thermal calibration track is written to each data surface at the time of manufacture of the disc drive and the drive is provided with a thermal calibration circuit that can sample the thermal calibration tracks while the servo transducer is following the servo track in the same cylinder as the thermal calibration tracks to determine servo transducer offsets, for each data transducer, that will result in data track following by the data transducer. The offsets are expressed by a thermal calibration relation from which the appropriate amount of offset of the servo transducer can be determined for any orientation of the disc stack as measured from an index generated from the servo pattern. In the operation of the disc drive, the thermal calibration relation is determined on drive start up and, in many cases, from time to time thereafter, and subsequently used to align selected data transducers with data tracks on selected disc surfaces each time a file is stored or retrieved.

While thermal calibration has proved to be an effective method for increasing disc drive storage capacity, it has been found that a further limitation on track density occurs in disc drives that employ a dedicated servo surface. As will be clear to those of skill in the art, components of the thermal calibration circuit are subject to electronic offsets, that is, amplifiers used in the thermal calibration circuit generally will not have a zero output for a zero input. As a practical matter, these electronic offsets, per se, will not interfere with the thermal calibration of the disc drive. The electronic offsets, per se, will give rise to a systematic difference between the radii of the servo and data tracks but will not interfere with the use of the dedicated servo surface approach to track following. The electronic offsets cause a problem because they are not constant. Hence, after a disc drive has been formatted, changes in the electronic offsets will lead to mechanical offsets between the data tracks and data transducers in the same manner that mechanical offsets between the data and servo transducers will lead to offsets between the data tracks and data transducers. Moreover, since the problem exists in the thermal calibration circuit, it cannot be detected and compensated by measuring the thermal calibration relation using such circuit. Thus, in the past, it has been necessary to limit the track density to a value such that variations in electronic offsets of components of the thermal calibration circuit will have only a negligible effect on the thermal calibration relation that is determined using the thermal calibration circuit.

SUMMARY OF THE INVENTION

The present invention provides a method for compensating for drift in the thermal calibration circuit to obtain a corrected thermal calibration relation from which the electronics offsets are excluded, thereby eliminating any effect that variations in these offsets would otherwise have on track following. To this end, during start up of the disc drive, a correction track is written to a selected data surface while the servo system is operated to cause the servo transducer to follow a servo track on the dedicated servo surface. Thereafter, while the servo transducer is caused to continue to follow the servo track in the same cylinder as the correction track, the correction track is sampled by the thermal calibration circuit to obtain a calibration correction that is indicative of the current electronic offset in the thermal calibration circuit. More particularly, the data transducer that writes and reads the correction track will be aligned with the correction track while the sampling takes place so that only the electronic offset can give rise to a nonzero output from the thermal calibration circuit. By subtracting the calibration correction from a thermal calibration relation obtained in the conventional manner, a corrected thermal calibration relation; that is, the thermal calibration relation that would be obtained in the absence of electronic offsets, is generated. Thus, the corrected thermal calibration relation will be determined solely by geometric offsets between servo and data tracks and transducers so that following a servo track with offsets determined in accordance with the corrected thermal calibration relation so determined for a particular data transducer will result in alignment between the data transducer and the data track in the cylinder that contains the servo track being followed with the offset.

Should a disc drive be operated for a time sufficient to require updating of the thermal calibration relation because of changes in the geometrical relationships of the transducers and tracks arising from temperature changes, primarily from heating of the spindle motor upon which the discs are mounted, the correction track can again be written and read to again obtain the calibration correction. However, in many cases, a rewriting of the correction track will be unnecessary. Rather, the correction track written at drive start up can be read to obtain the calibration correction as will be discussed below.

An important object of the present invention is to provide a thermal calibration method that will permit the spacing between tracks in a disc drive to be decreased to increase the data storage capacity of the disc drive.

Another object of the invention is to provide a method for offsetting a servo transducer from servo tracks of disc drives employing a dedicated servo surface to cause data transducers to follow closely spaced data tracks on data surfaces of the disc drive.

Yet another object of the present invention is to provide a method for compensating for drift in electronics utilized to enable thermal calibration of data transducers in a disc drive.

Other objects, features and advantages of the present invention will become apparent from the following detailed description when read in conjunction with the drawings and appended claims.

BRIEF DESCRIPTION OF THE DRAWINGS

FIG. 2 is a fragmentary perspective view of discs of the disc drive of FIG. 1 illustrating the relationship between servo patterns on the dedicated servo surface and thermal calibration and correction tracks written to a data surface in the practice of the method of the present invention.

FIG. 5 is a flow chart of the fine control mode routine of the interrupt program of FIG. 4.

FIG. 6 is a flow chart of the receive new command command routine of the interrupt program of FIG. 4.

FIG. 12 is a flow chart of the adjust coefficients command routine executed by the servo microprocessor in response to an adjust coefficients command received from the system microprocessor.

FIG. 13 is a flow chart of the programming of the system microprocessor of the disc drive of FIG. 1 for implementing a second preferred embodiment of the method of the present invention.

FIG. 14 is a flow chart of the execute thermal calibration routine shown in FIG. 13.

DISC DRIVE DESCRIPTION

Figure 1:
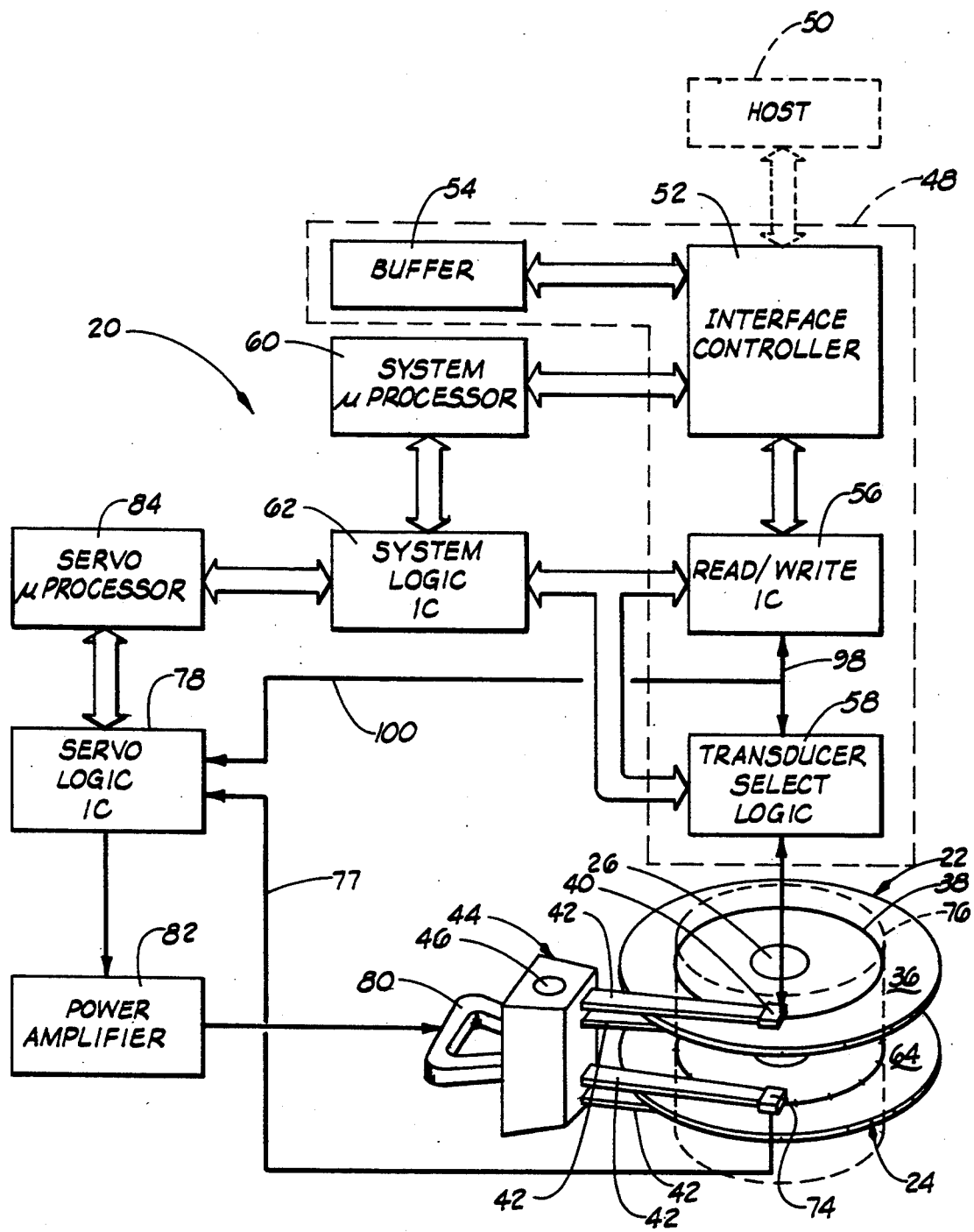
FIG. 1 is a schematic representation of a disc drive in which the method of the present invention can be advantageously practiced.

In order to provide a basis for describing the method of the present invention, it will be useful to initially consider the construction of a disc drive in which the invention may be practiced. For this purpose, FIGS. 1 through 3 have been included to generally illustrate the construction of a typical hard disc drive. It will be understood by those of skill in the art that the method of the present invention is not limited to disc drives having the specific construction shown in these drawings; rather, such construction has been presented in the spirit of providing a concrete example that will simplify an understanding the invention. Thus, no limitation not expressed in the claims is intended nor should any such limitation be inferred from the specific form of the disc drive that has been illustrated in the drawings and described below.

Similarly, for purposes of illustration, but not of limitation, it will be assumed herein that the invention will be practiced using the digital servo system that has been described in U.S. patent application Ser. No. 738,053 filed Jul. 31, 1992 by Duffy et al. and entitled "Hard Disc Drive With Improved Servo System" and, further, that the disc drive is programmed using the methods described in the aforementioned U.S. patent application Ser. No. 738,053 and in U.S. patent application Ser. No. 738,584, filed Jul. 31, 1992 by Hampshire and entitled "Multi-Task Operating System for a Disc Drive". The teachings of both of these United States Patent Applications are hereby incorporated by reference.

Referring first to FIG. 1, shown therein and designated by the general reference numeral 20 is a block diagram of a typical hard disc drive in which the present invention may be advantageously practiced. In general, the disc drive 20 is comprised of a plurality of discs, two of which have been illustrated and designated by the numerals 20 and 22, that are mounted in a stack on a spindle 26, for rotation of the discs 22, 24 about the axis of the spindle 26. The discs 22, 24 are provided with magnetizable surface coatings, illustrated at 28, 30, 32 and 34 in FIGS. 8A through 8D, so that data can be stored on the discs 22, 24 in the form of magnetized cells defined along circular data tracks defined on the data surfaces of the discs as will be described below. One such data track, designated 38 in FIG. 1., has been illustrated for the upper surface 36 of the disc 22.

Data is written to the data surfaces and read therefrom by a plurality of data transducers that are supported proximately the disc surfaces, as shown for a transducer 40 and the disc surface 36 in FIG. 1, by an electromechanical actuator 44 via support arms 42. As will be discussed below, the actuator can be pivoted on a spindle 46 to align the data transducers with selected tracks on the data surfaces of the discs.

To provide for the reading and writing of files, the disc drive 20 is comprised of a conventional read/write channel 48 that effects the transfer of files between a host 50, the source of files to be stored and the user of previously stored files, and a selected data transducer. As is conventional, the read/write channel 48 is comprised of an interface controller 52, that coordinates data transfers from the host 50 to a buffer 54 and thence to a read/write IC 56 that serializes data of which the file is comprised, encodes the file for storage to the data surfaces and subsequently decodes and deserializes the file when it is retrieved. During writing of a file, electrical signals indicative of the contents of the file are transmitted serially from the read/write IC 56 to a data transducer via a transducer select logic 58 that selects a particular data transducer that is to write the file. During reading of a file, signals indicative of the pattern of magnetization of the data tracks are induced in the data transducers as the disc surfaces pass the data transducers and the transducer select logic 58 transmits signals induced in a selected data transducer, the data transducer proximate the disc surface on which the file is stored, to the read/write IC 56 for subsequent transfer to the buffer 54 and thence to the host 50.

General control of the operation of the disc drive 20 is exercised by a system microprocessor 60 that provides appropriate control signals to the interface controller 52, the read/write IC 56 and the transducer select logic 58 to orchestrate the transfer of data to and from the host 50 and to select the data surface and track thereon for storage or retrieval of a file. Control of the latter two circuits is effected via a system logic IC 62 by control words indicative of conventional operations that are carried out by such circuits during the reading or writing of files. As will be discussed below, control words outputted to the system logic IC are further utilized to effect control of movements of the data transducers by the drive servo system to be described below.

While the general operation of the disc drive 20 and the read/write channel 42 are conventional so that they need not be described in detail for purposes of disclosing the present invention, several features of such general control and read/write channel operation are employed in the present invention and will, accordingly, now be described.

As noted above, transfer of files between the host 50 and the read/write IC 56 is carried out via the buffer 54; that is, a file to be stored is transferred from the host 50 to the buffer 54 and thence to the read/write IC 56 and a file being retrieved is transferred from the read/write IC 56 to the buffer 54 and thence to the host 50. Access to data stored in the buffer 54 is commonly provided for the system microprocessor 60 for the correction of errors that may be detected in the reading of a file by the use of error checking codes commonly appended to portions of the files during writing and read when the file is subsequently read. Typically, such access is effected via the interface controller 52, which addresses storage locations in the buffer and transmits data to and from such locations, so that the contents of any storage location in the buffer 54 can be changed by the system microprocessor 60 via conventional control and data signals transmitted to the controller 52. As will be discussed below, this feature is utilized in the present invention to write a selection of data generated in the system microprocessor 60 to the buffer 54 for subsequent transfer to the disc surface 36. The purpose of such writing and transfer will become clear below.

Similarly, it has been noted that the read/write IC encodes data of which a file is comprised prior to storage on a disc surface and decodes signals received from a data transducer when a file is read. As is known in the art, such encoding and decoding maximizes the amount of data that can be stored per unit length of data track while minimizing the error rate in the storage and subsequent retrieval of files. The code used by the disc drive 20 is utilized in the selection of data that is written to the buffer 54 in the practice of the present invention as will be discussed below.

As has been noted, a file is stored on selected data tracks on selected disc surfaces and, accordingly, the disc drive 20 is comprised of a servo system (not numerically designated in the drawings) to maintain radial alignment between the data transducer currently writing or reading data and the selected data track on the surface proximate such transducer. The present invention contemplates that the servo system is of the type in which one surface of one disc, the surface 64 in FIGS. 1, 2 and 8A through 8D, is selected as a dedicated servo surface to which servo information is written at the time of manufacture of the disc drive 20. As more fully described in the aforementioned U.S. patent application Ser. No. 738,053, the dedicated servo surface 64 is angularly divided into a plurality of servo frames, one of which has been partially illustrated and designated by the reference numeral 66 in FIG. 2, that includes a position field 68 to which servo dibits 70 are written in a pattern of repeating subfields to define a series of concentric servo tracks, two of which have been illustrated in FIG. 2 and indicated by the reference numerals 72 and 73 therein. (For clarity of illustration, only one repetition of the subfields has been shown in FIG. 2. As disclosed in the aforementioned U.S. patent application Ser. No. 738,053, the servo dibit pattern may be repeated a larger number of times in the position field 68. Similarly, the servo pattern need not have the specific form that has been illustrated in FIG. 2. Rather, such form and the reference to United States Patent Application have been presented in the spirit of providing a concrete example that will enhance an understanding of the invention.)

Corresponding to the designation of the disc surface 64 as a dedicated servo surface, the transducer 74 (FIG. 1) proximate the surface 64 is a servo transducer which responds to passage of the servo frames to generate position signals indicative of the radial location of the servo transducer 74 for positioning the actuator 44 for following servo tracks as will be described below. Since all of the transducers are mounted on the actuator 44, data track following by a data transducer 40 can be effected by organizing the data tracks, such as the data track 38 in FIG. 1, into concentric cylinders 76, one of which has been illustrated in dashed line in FIG. 1, which each contain a servo track and causing the servo transducer to follow the servo track in the same cylinder as a data track to be followed.

With continuing reference to FIG. 1, signals generated in the servo transducer 74 are transmitted on a signal path 77 to a servo logic IC 78 which samples the position fields of successive servo frames, as will be discussed below, and provides the samples to a servo microprocessor 84 for repetitive calculation of an actuator correction signal used to reposition the servo transducer with respect to the servo tracks to maintain servo track following by the servo transducer while data is written to or read from a data track. Specifically, the actuator 44 is comprised of a coil 80 that is immersed in a magnetic field and the actuator correction signals are outputted to the servo logic IC 78 for transmission to a power transconductance amplifier 82 that drives a current through the coil 80 in relation to the actuator correction signals to give rise to a force on the actuator 44 in accordance with the familiar Lorentz relation.

As is conventional in the art, the servo microprocessor 84 responds to commands issued by the system microprocessor 60 via the system logic IC 62 so that any cylinder can be accessed and subsequently followed by appropriate commands issued to the servo microprocessor 84. To this end, the system logic IC 62 includes a communications circuit (not shown); for example, the communications circuit described in the aforementioned U.S. patent application Ser. No. 738,053, by means of which commands are issued to the servo microprocessor 84 along with parameters used to carry out the commands. Similarly, the communications circuit is used to report the completion of commands by the servo microprocessor 84 and transmit parameters measured in response to commands to be discussed below to the system microprocessor 60.

As can be seen from the above general description of the disc drive 20, the system microprocessor 60 implements the writing a file to a selected data track on a selected disc surface by commanding the servo microprocessor 84 to move the servo transducer 74 to the cylinder that contains the data track and, after the transducers have reached the cylinder and stable track following by the servo transducer 74 has been achieved, by selecting the data transducer proximate the selected data surface for writing the file and issuing conventional commands to the interface controller 52 and the read/write IC 56 to cause transfer of the file to the transducer select logic 58 and thence to the selected data transducer. Reading of a file differs only in that the selected data transducer provides a source of data that is transferred to the read/write IC 56 and, ultimately, to the host 50.

Figure 3:
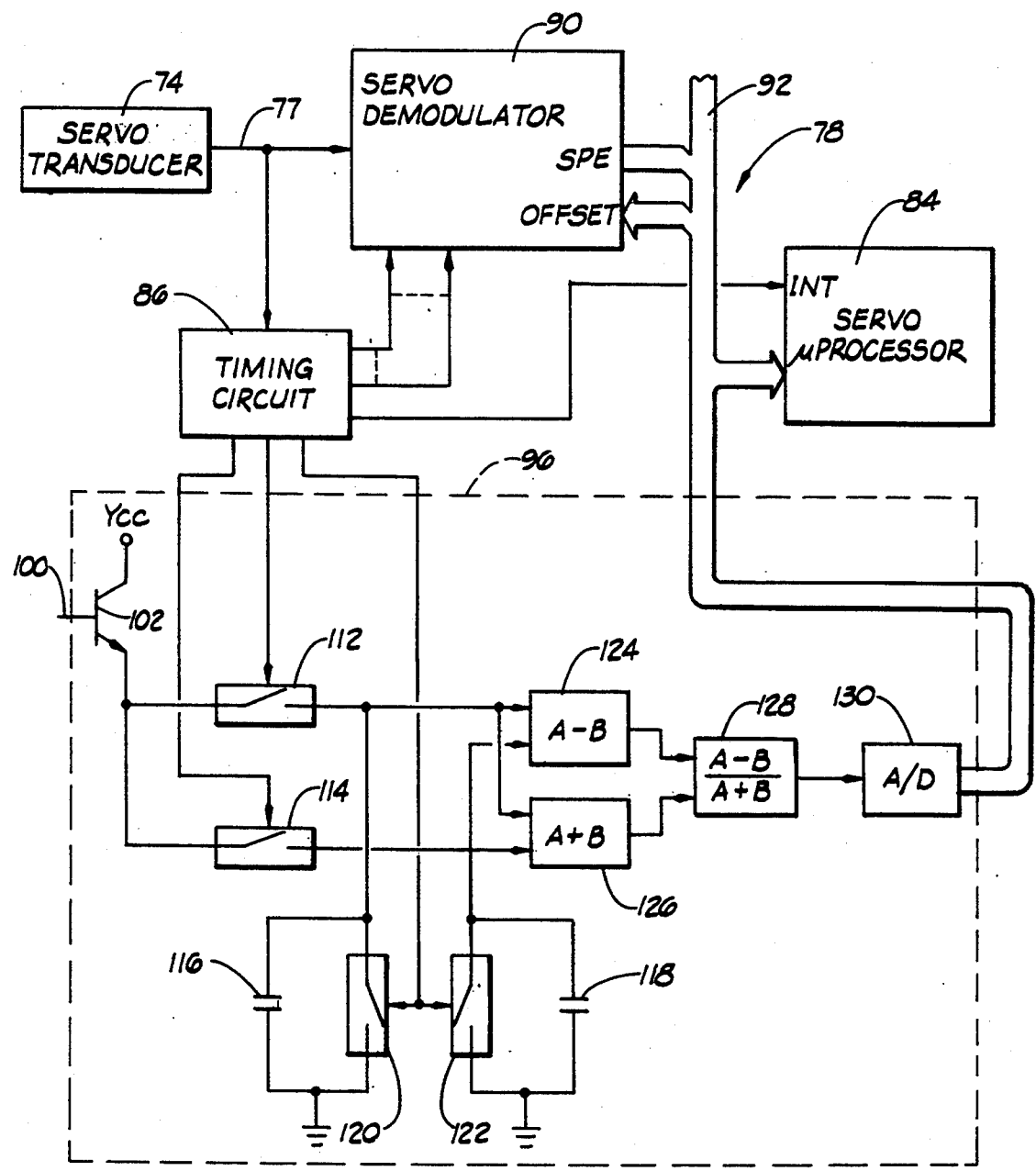
FIG. 3 is a block diagram of portions of the servo system of the disc drive of FIG. 1.

Referring now to FIG. 3, shown therein are portions of the servo logic IC 78 that are relevant to the present invention. The servo logic IC 78 is generally comprised of a timing circuit 86 that receives signals induced in the servo transducer 74 on the signal path 77 and locks onto such signals, in a manner that has been described in the aforementioned U.S. patent application Ser. No. 738,053, to divide each frame into a succession of time intervals that are directly related to the location of the servo transducer 74 within each frame. More particularly, the timing circuit 86 generates timing signals that are transmitted to a servo demodulator 90, more fully described in the aforementioned U.S. patent application Ser. No. 738,053, that samples the location of the servo transducer 74 as the position field 68 passes the servo transducer 74 and generates a servo position error (SPE) that can be placed on the data bus 92 of the servo microprocessor 84 for input into the microprocessor 84. A feature of the servo demodulator 90 that is utilized in the present invention is a capability for measuring the SPE with respect to an offset that is transmitted to the servo demodulator 90 from the servo microprocessor 84. The use of this feature will be discussed below.

Additionally, the timing circuit 86 provides an interrupt signal to the servo microprocessor 84 that indicates completion of passage of each servo frame 66 by the servo transducer; that is, as the dashed line 94 in FIG. 2 passes the servo transducer 74. As will be discussed below, servo operations are carried out by the servo microprocessor 84 in an interrupt program so that, each time a frame 66 passes the servo head, an appropriate actuator correction signal can be calculated by the servo microprocessor 84 and outputted to the servo logic IC 78 to cause the amplifier 82 to adjust the current through the actuator coil 80 in a manner that will, subject to any offset received by the demodulator 90, correct misalignment between the servo transducer 74 and a servo track being followed.

In accordance with the present invention, the servo logic IC 78 is further comprised of a thermal calibration circuit 96 that receives signals from a data transducer that is selectable by the system microprocessor 60 via control signals transmitted to the transducer select logic 58 shown in FIG. 1. To this end, the signal path 98 (FIG. 1) that serially transmits data signals between the read/write IC 56 and the transducer select logic 58 is tapped via a signal path 100 that has been shown in FIG. 1 and carried into FIG. 3. The signal path 100 extends to the base of a transistor 102 whose collector is connected to the disc drive power supply (not shown) so that the transistor will produce a signal at its emitter that is proportional to the amplitude of signals induced in any data transducer selected by the system microprocessor 60.

In the practice of the invention, the signals on the signal path 100 are sampled at selected times in relation to the servo frames as will now be described with respect to FIG. 2. As shown for the data surface 36, a thermal calibration track 102 is written to each data surface at the time of manufacture of the disc drive 20 in the cylinder that includes the servo track 73 on the dedicated servo surface 64. As in the case of the servo tracks, the thermal calibration tracks are divided into frames, one of which has been indicated at 104 in FIG. 2, and each frame of the thermal calibration track is radially aligned with a servo frame on the dedicated servo surface 64. Thus, the end of each thermal calibration frame, indicated by the dashed line 107, will become radially aligned with the data transducer proximate the data surface 36 at substantially the same time that the end of a servo frame reaches the servo transducer 74 and the servo microprocessor 84 is interrupted.

Similarly, as in the case of the servo tracks, the thermal calibration tracks are written in a pattern that permits sampling of the radial locations of the data transducers with respect to the centers of the thermal calibration tracks via the sampling of signals appearing on the signal path 98 between the read/write IC 56 and the transducer select logic 58. More particularly, each frame of the thermal calibration tracks is comprised of an A burst pattern 106 and a B burst pattern 108 that each extend along disjoint portions of the thermal calibration track on opposite sides of track center. The burst patterns are each comprised of a series of oppositely magnetized cells 110 that will induce an emf pulse in a data transducer proximate the data surface to which the bursts are written as each boundary between successive cells passes the transducer. Moreover, the amplitudes of these pulses generally reflect the extent to which data transducers overlap the burst patterns. Thus, since the A and B burst patterns are on opposite sides of the thermal calibration track center, the relative amplitudes of the emf pulses induced in a data transducer by passage of the bursts by the transducer will provide a measure of the radial location of the data transducer with respect to the center of the thermal calibration track.

Returning to FIG. 3, the emitter of the transistor 102 is connected to an electronic switch 112 that is closed by the timing circuit 86 at such times that the A burst patterns become radially aligned with the data transducers to transmit the emf pulses induced in one data transducer, selected by the system microprocessor 60 via appropriate control signals to the transducer select logic 58, to a grounded capacitor 116 that peak detects the emf pulses. Emf pulses induced in the same data transducer while the data transducers are radially aligned with the B burst patterns are similarly peak detected by a switch 114 and a capacitor 118. At times that the data transducers are aligned with neither the A or B burst patterns, the timing circuit 86 provides signals that close the switches 120 and 122, connected in parallel with the capacitors 116 and 118 respectively, to discharge the capacitors. The capacitors 116 and 118 are connected to the inputs of difference and summing amplifiers, 124 and 126 respectively, whose outputs are transmitted to a divider 128. Thus, following passage of the A and B burst patterns by a selected data transducer, while the data transducer is following the thermal calibration track, the output of the divider will have an amplitude that is proportional to the location of the selected data transducer with respect to the thermal calibration track on the disc surface proximate the data transducer. Accordingly, the location of any selected data transducer can be sampled as each servo frame passes the servo transducer and the samples are provided to the servo microprocessor 84 for purposes to be described below via an A/D converter 130.

Operation of the Disc Drive

Figures 4, 7:
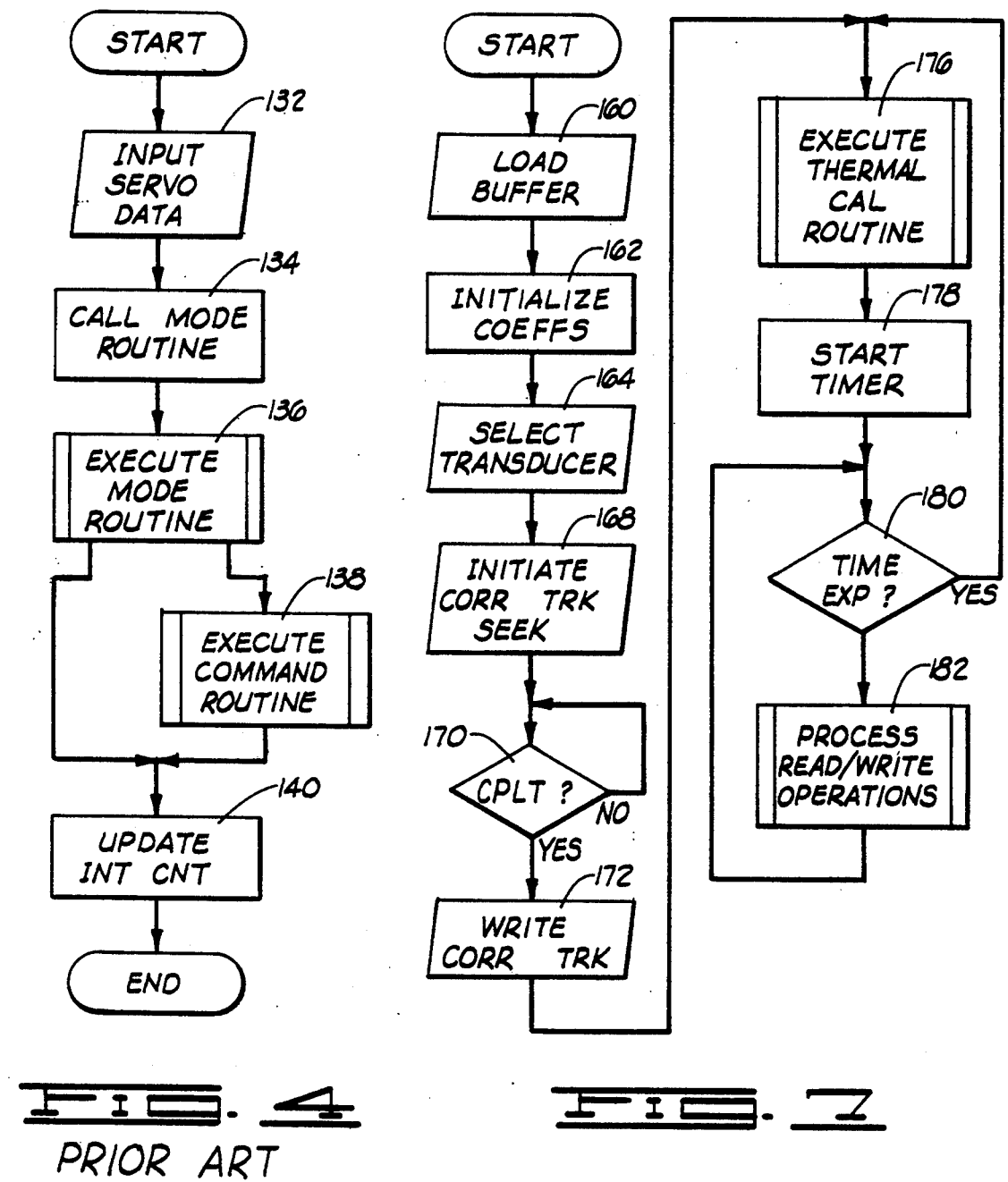
FIG. 4 is a flow chart of the interrupt program used in the implementation of servo operations in the disc drive of FIG. 1.
FIG. 7 is a flow chart of portions of the system microprocessor main program for implementing one preferred embodiment of the present invention.
Figure 8:
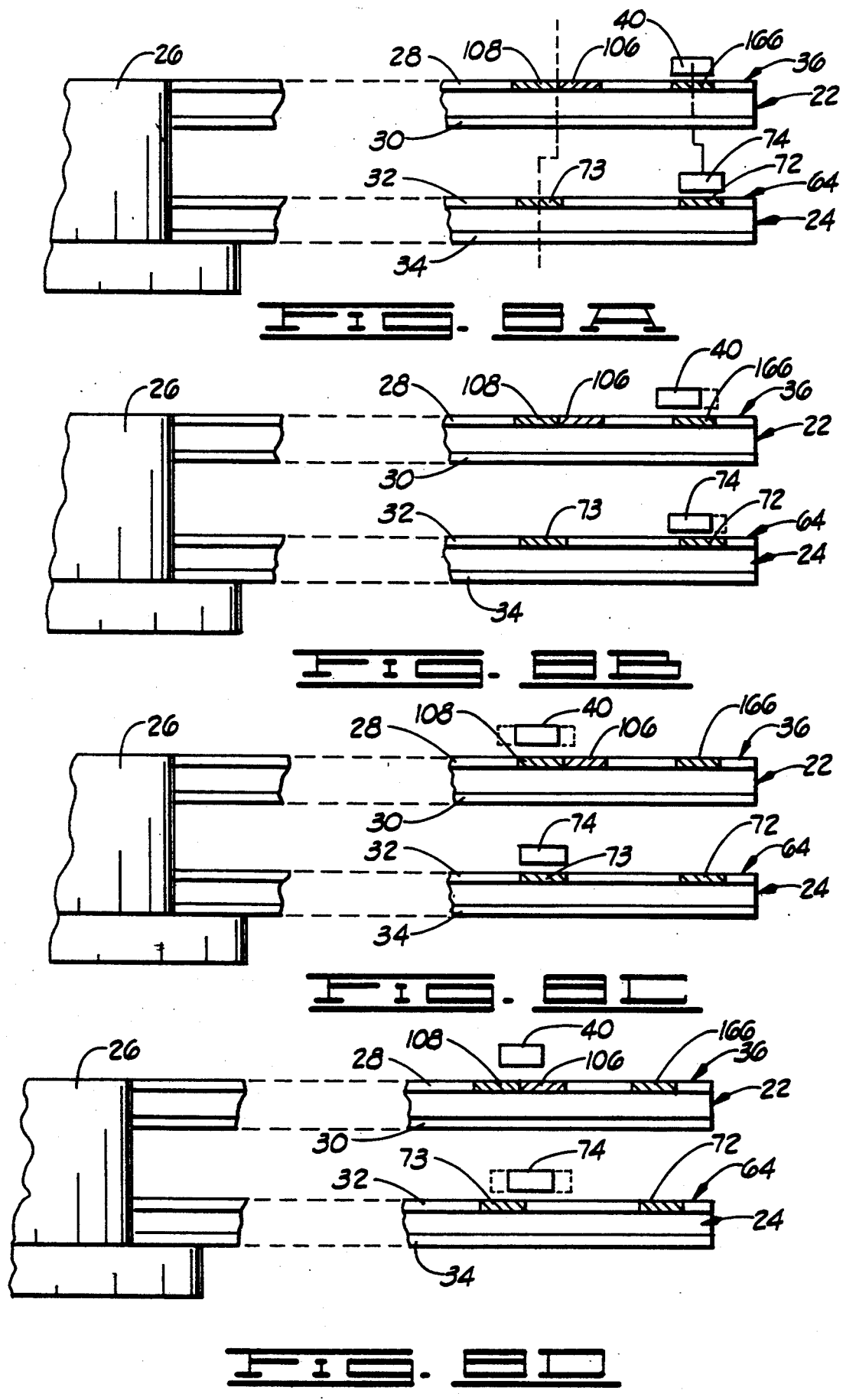
FIGS. 8A, 8B, 8C and 8D are fragmentary views of the disc drive of FIG. 1 illustrating the positioning of the servo transducer and one of the data transducers at selected times in the practice of the present invention.

In the disc drive 20 that has been described above, servo operations are carried out during interrupts using a general interrupt program that has been illustrated by the flow chart shown in FIG. 4. In response to the interrupt signal received from the timing circuit 86 at the completion of passage of a servo frame by the servo transducer 74, the servo microprocessor initially inputs, at step 132, servo data generated by the servo logic IC 78. In the practice of the present invention, such data includes not only the SPE generated by the servo demodulator 90 but also the contents of the divider 128 of the thermal calibration circuit 96. Thus, such times that the servo transducer 74 is following the servo track 73 in the cylinder that includes the calibration tracks on the data surfaces and the system microprocessor 60 has placed the disc drive in a read mode of operation in which signals induced in a selected data transducer appear on the signal path 98 between the read/write IC 56 and the transducer select logic 58, the servo microprocessor 84 will sample both the location of the servo transducer 74 with respect to the servo track 73 and the location of the selected data transducer with respect to the calibration track on the data surface proximate the selected data transducer.

Following input of the servo data, a mode routine selected in a manner that has been described in the aforementioned U.S. patent application Ser. No. 738,053, is called, step 134, and executed, step 136. As also described is such patent application, the execution of the interrupt program by the servo microprocessor 84 may, or may not, include the execution of a selected command routine 138. Specifically, the command routine is executed only if the selected mode routine includes a call for a command routine. Following the execution of the command routine, or the mode routine if no command routine is called, the interrupt program updates an interrupt count, step 140, and the servo microprocessor 84 returns to its main program. As described in U.S. patent application Ser. No. 738,053, each servo frame 66 includes a sector field (not shown) and an index circuit (not shown) that provides an index signal to the servo microprocessor 84 each time the discs pass through a selected index location for the discs. In the present invention, the interrupt count is reset each time the index signal is received so that the interrupt count provides a measure of the location of the servo and data transducers with respect to the index location and, accordingly a measure of the angular orientation of the discs. The purpose of measuring the angular orientation of the discs at each interrupt of the servo microprocessor 84, as such measurement relates to the present invention, will become clear below.

FIGS. 5 and 6 are, respectively, a fine control mode routine and selected portions of a receive new command command routine, more fully described in the aforementioned U.S. patent application Ser. No. 738,053, that are used to radially position the data and servo transducers during the storage and retrieval of files. Referring first to FIG. 5, the fine control mode routine begins with the calculation of the actuator correction signal, step 144, from the SPE inputted at the start of each interrupt. As is conventional, the actuator correction signal is calculated on the basis of a suitable actuator control scheme; for example, a PID scheme, and outputted, step 146, to the servo logic IC 78 to reposition the servo transducer with respect to a servo track being followed to maintain track following by the servo transducer. Specifically, the actuator correction signal provides the input to the power amplifier 82 to adjust the current through the actuator coil 80. As noted above, the SPE is measured with respect to the offset transmitted to the servo demodulator 90 so that, in view of the calculation of the actuator correction signal from the SPE, the adjustment of the servo transducer location that will be effected by output of the actuator correction signal will be an adjustment to a position that will, in general, be radially offset from the center of the servo track being followed. As will become clear below, such positioning of the servo transducer with an offset is used to cause a selected data transducer to follow, without radial offset, the data track on the data surface proximate the selected data transducer that is in the same cylinder as the servo track being followed by the servo transducer 74. The fine control mode routine includes the call of a command routine at step 148 and, during track following operations during which a file is read or written to a disc surface, such command routine will be the receive new command command routine, pertinent operations of which have been illustrated in FIG. 6.

In the receive new command command routine, the communications circuit (not shown) in the system logic IC 62 is checked by the servo microprocessor 84 to determine whether a new command has been issued to the servo microprocessor 84 by the system microprocessor 60, step 150, and, if so, the new command is inputted, step 152, along with any servo parameters that may be necessary to execute the command, step 154. Parameters relevant to the present invention will be described below. If no new command has been issued, the offset to be transmitted to the servo demodulator 90 is calculated, step 156, in accordance with a thermal calibration relation to be described below and outputted to the demodulator 90 at step 158. It is to the determination of the offsets that we now turn.

Initially, it will be useful to review the basis for using the offsets in the repositioning of the servo transducer 74 during read/write operations carried out by the disc drive 20. While the data transducers and the servo transducer 74 are mounted on a common actuator 44, so that all of the transducers will generally lie along a line that parallels the axis of the spindle 26, such alignment is not exact and, moreover, changes with time as the temperature of the disc drive changes. As a result, if the servo and data tracks in each cylinder are coaxial, radial alignment of the servo transducer 74 with a servo track will cause a constant radial misalignment of the data transducers with the data tracks in the same cylinder as the servo track. Hence, to cause a data transducer to follow a data track, the servo transducer 74 must be offset from the servo track in the same cylinder. Moreover, in general, the data and servo tracks will generally not be coaxial during operation of a disc drive. Because of thermal expansion effects, the relative locations of the centers of the discs change from one operation of a disc drive to the next and with time during the operation of the disc drive. The result is a generally sinusoidal variation in the relative radii of data and servo tracks with orientation of the discs. Additionally, minor departures from a generally parallel relation between the discs will result in both a constant and an orientation dependent misalignment between each data transducer and the data tracks at such times that the servo transducer is radially aligned with a point on a servo track.

Thus, in general, an appropriate offset of the servo transducer from a servo track to cause data track following by a data transducer in the same cylinder will have both a dc and an ac component, both of which vary from one operation of the disc drive 20 to the next, that will cause a selected data transducer to follow data tracks on the data surface proximate the data transducer. The offset that is determined at 156 in FIG. 6 and outputted to the servo demodulator 90 is selected to cause the servo transducer 74 to follow a sinuous path about a servo track that will, in turn, result in data track following without offset.

Since the offsets of the servo transducer 74 required to cause a selected data transducer to follow a data track on a data surface vary from one operation of a disc drive to the next and from time to time during lengthy operation of a disc drive, it has become conventional to develop a thermal calibration relation, for each data surface, from which the offsets can be calculated and outputted to the servo demodulator 90 at step 156 of the receive new command command routine illustrated in FIG. 6. It is for this purpose that the thermal calibration tracks, such as the track 102 on data surface 36, are written to each of the data surfaces and the thermal calibration circuit 96 is included in the servo logic IC 78. More particularly, the thermal calibration tracks are sampled by the thermal calibration circuit 96 and the samples are used to derive coefficients of the thermal calibration relations that are stored in the system microprocessor 60 and outputted to the servo microprocessor 84 whenever a data track on a selected data surface is to be followed.

As is known in the art, the form of the thermal calibration relations can be expressed as $$Offset(n) = DC + (AC \cos \phi) \cos(2\pi n/N) + (AC \sin \phi) \sin(2\pi n/N) \quad (1)$$

where Offset(n) is the total offset required for the nth servo frame from index, N is the number of servo frames for one complete revolution of the servo surface, DC is the dc component of the required offset, and AC and $\phi$ are the amplitude and phase, respectively, of the ac component of the required offset. It can be shown that the coefficients, DC, AC cos $\phi$, and AC sin $\phi$, can be determined from the relations $$DC = (1/N) \Sigma \, Offset(i) \quad (2)$$

$$AC \cos \phi = (2/N) \Sigma \, Offset(i) \cos(2\pi i/N) \quad (3)$$

and $$AC \sin \phi = (2/N) \Sigma \, Offset(i) \sin(2\pi i/N) \quad (4)$$

where the summations are carried out over N values. Thus, in principle, the thermal calibration relations can be developed for each data surface by measuring the sums $$S1 = \Sigma \, TC(i) \quad (5)$$

$$S2 = \Sigma \, TC(i) \cos(2\pi i/N) \quad (6)$$

$$S3 = \Sigma \, TC(i) \sin(2\pi i/N) \quad (7)$$

where the TC(i) are N consecutive samples of the thermal calibration track on that data surface obtained using the thermal calibration circuit 96 while the servo transducer 74 is following the servo track in the same cylinder as the thermal calibration tracks and multiplying the sums by the appropriate factor (1/N) or (2/N). The assumption underlying the use of these sums is that TC(i) and Offset(i) are the same quantities. The assumption is only an approximation because of the presence of electronic offsets in the thermal calibration circuit 96. In particular, TC(i) and Offset(i) will differ by the electronic offset in the thermal calibration circuit 96 at the time the sampling of a thermal calibration track is carried out. As a result, the use of the sums in equations (5), (6) and (7) in place of the sums in equations (2), (3) and (4) will yield only nominal thermal calibration relations which, when used to offset servo transducers, will result in data track following only for disc drives in which the track spacing is sufficiently large that the effect of the electronic offsets is negligible. In the present invention, the servo transducer 74 is offset in accordance with corrected thermal calibration relations, having the coefficients expressed by equations (2), (3) and (4), that are determined in a manner that will be described with respect to FIGS. 7 through 14. The coefficients of these thermal calibration relations are stored by the system microprocessor 60 and outputted, on a data surface basis, to the servo microprocessor 84 prior to storage of a file to a selected disc surface or retrieval therefrom.

Referring to FIG. 7, shown therein is a flow chart illustrating portions of the system microprocessor main program that relate to the present invention for one preferred method of obtaining the corrected thermal calibration relations. As shown therein, during start up of the disc drive 20, a selection of data is loaded into the buffer 54 using the above described capability of the system microprocessor 60 to write to any location in the buffer 54. In particular, the system microprocessor 60 is programmed to address a number of consecutive locations in the buffer 54, equal to the number of data bytes that can be written to a data track in the operation of the disc drive 20, and to write a data byte to each address. To this end, the step 160 includes a repetitive routine that generates the data bytes consistently with the coding of data during normal read/write operations to maximize the density of magnetization reversals along a track to which the selection of data will be written in the practice of the present invention. Thus, for example, if the disc drive 20 employs a 1,7 code in storing files, the data bytes are selected to repetitively write bits to a disc in a pattern in which each logical 1 is followed by one logical zero, the maximum density of logical 1's that is consistent with the 1,7 code.

Following the loading of the buffer, the coefficients of the thermal calibration relations, for all data surfaces, are initialized to zero, step 162, and stored in selected locations in the memory of the system microprocessor 60. It will be noted that, since the coefficients of the thermal calibration relations are stored for each data surface and transmitted to the servo microprocessor 84 for calculation of the servo offsets, the servo transducer 74 will initially follow the servo tracks without offset.

Following the initialization of the coefficients, the system microprocessor 60 selects a data transducer, step 164, for writing the data selection that has been loaded into the buffer 54 and, for purposes of example, the drawings contemplate that such data transducer will be the data transducer 40 proximate the data surface 36.

Similarly, the system microprocessor 60 will select a correction track to which the data selection will be written on the data surface 36 and, for purposes of illustration, the drawings contemplate that the correction track will be the data track, designated 166 in FIGS. 2 and 8A through 8D, in the same cylinder as the servo track 72 on the dedicated servo surface 64. (In FIGS. 8A through 8D, the tracks 72, 73 and 166 have been indicated by shaded portions of the surface coatings 28 and 32, generally indicating the width of the servo and data transducers to more clearly bring out geometric aspects of the tracks that play a role in the practice of the present invention. Similarly, the A and B burst patterns 106 and 108 have been indicated as shaded portions of the coating 28 on the disc surface 36.) Once the transducer 40 has been selected, the system microprocessor initiates a seek to the correction track, step 168, by outputting the cylinder address at which the seek is to terminate, the cylinder that contains the correction track 166 for the step 168, the coefficients of the selected transducer, and a seek command to the communications circuit of the system logic IC 62. The manner in which the seek is carried out has been described in the aforementioned U.S. patent application Ser. No. 738,053, the teachings of which have been incorporated by reference herein, so that the seek need not be described for purposes of the present invention. Rather, it will suffice to note that the seek terminates with the servo microprocessor 84 conditioned to execute the fine control mode routine that has been illustrated in FIG. 5 and the receive new command command routine that has been illustrated in FIG. 6 each time the servo microprocessor is interrupted. Since the thermal calibration coefficients have been initialized to zero, the offset that is calculated at step 156 of FIG. 6 will be zero when track following commences at the end of the seek. Thus, as shown in FIG. 8A, when the seek has been completed, the radial position of the servo transducer 74 will be repetitively adjusted in accordance with the fine control mode actuator control relation and receive new command command routines illustrated in FIGS. 5 and 6 respectively to follow the servo track 72 without offset. Correspondingly, the data transducer 40 will follow a circular path, defining the correction track 166, that will be offset from the servo track 72 by any present misalignment between the servo transducer 74 and the data transducer 40.

Following the initiation of the seek to the correction track, the system microprocessor 60 enters a loop in which the communications circuit in the system logic IC is repetitively polled for a report from the servo microprocessor 84 that the seek has been completed. When the seek is complete, decision block 170, the data that has been previously loaded into the buffer 54 is transmitted to the previously selected data transducer; that is, the data transducer 40, and written, step 172, to the previously selected data track; that is, the correction track 166 on disc surface 36, by formatting the correction track in a conventional manner using the data loaded into the buffer 54 at step 160. Thus, following the execution of the step 170, the correction track 166 will be magnetized in a series of oppositely magnetized cells 174 that extend the full circumference of the track 166 as indicated at 174 in FIG. 2.

Once the correction track has been written, the system microprocessor executes a thermal calibration routine 176 in which the corrected thermal calibration relation is determined for all of the data transducers, starts a timer, step 178, and proceeds to a loop in which files are stored to the disc surfaces and retrieved therefrom. As shown in FIG. 7, the loop is comprised of a decision block 180 in which the time of operation of the disc drive since the timer was started is checked and, if such time is less than a preselected time, the system microprocessor 60 processes any read or write operation requested by the host 50, step 182, and again executes a time check. Once the selected time has expired, the system microprocessor returns to step 176 to again execute the thermal calibration routine. Such routine has been illustrated by positions of the transducers 40 and 74 with respect to the tracks 72, 73, 106 and 166 in FIGS. 8B through 8D and by a flow chart in FIG. 9.

Since the main program for the system microprocessor 60 contemplates that the thermal calibration routine will be repeated from time to time, the coefficients most recently transmitted to the servo microprocessor 84 may be previously determined coefficients and the servo transducer 74 may be following any servo track at the time the thermal calibration routine begins. Thus, to cause the servo transducer to follow a particular track with selected offsets and to cause sampling of data tracks by a particular data transducer, it is necessary to issue a seek command along with coefficients that will produce the desired offset. Accordingly, the thermal calibration routine begins with the initialization of the coefficients of the thermal calibration relation, step 184, to be used in initial portions of the thermal calibration routine. In the preferred practice of the invention, the ac coefficients of the thermal calibration relation are initialized to zero at step 184 and the dc coefficient is initialized to a value that will cause the servo transducer 74 to follow servo tracks with an offset equal to a selected fraction of the spacing between servo tracks. (Since previously determined coefficients may be stored in system microprocessor locations reserved for such purposes at the time such initialization is carried out and since, as will become clear below, it is desirable that these coefficients be saved, the initialization at step 184 is effected by entering the selected values for the coefficients in scratch RAM.) The purpose of such selection will become clear below. Similarly, the data transducer to be initially used in the execution of the thermal calibration routine is selected, step 186, to be the data transducer 40 that is used to write the correction track 166. Following these selections, a seek is initiated, step 188, to the cylinder that includes the correction track 166 by outputting the address of the servo track 72, the selected coefficients and a seek command to the communications circuit in the system logic IC 62. Following issuance of the command, the system microprocessor enters a loop in which communications circuit is repetitively polled to determine whether the execution of the seek command has been completed as indicated by the decision block 190 in FIG. 9.

In response to the seek command, the servo microprocessor 84 will execute the seek, in the manner described in the aforementioned U.S. patent application Ser. No. 738,053, and, once the seek has been completed, commence track following with the transducers 40 and 74 positioned with respect to the tracks 166 and 72 respectively as generally shown in FIG. 8B. Specifically, both will be shifted, with respect to the positions indicated by dashed lines occupied by the transducers 40, 72 during writing of the correction track 166, by the fraction of a track spacing selected for the dc component of the thermal calibration relation in step 184.

(FIG. 8B illustrates the positions of the transducers for the initial execution of the thermal calibration routine that occurs immediately following the writing of the correction track 166. Because of thermal effects, the relative positions of the correction track with respect to the servo track 72 and the data transducer 40 with respect to the servo transducer 74 will generally be changed for subsequent executions of the thermal calibration routine. This point will be discussed more fully below.) Stable track following, with the selected dc offset of the servo transducer 74 from the servo track 72 will then ensue with the servo microprocessor executing the fine control mode routine, FIG. 5, and the receive new command command routine, FIG. 6, at each interrupt that occurs with passage of a servo frame on the servo track 72 as has been described above.

Once the servo microprocessor 84 has reported the completion of the execution of the seek to the correction track, the system microprocessor 60 initiates the accumulation of a calibration correction, step 192, by outputting an accumulate command to the servo microprocessor 84. Since, at this time, the servo microprocessor 84 will be executing the receive new command routine with each interrupt, the accumulate command will be entered at the next servo microprocessor interrupt to cause the servo microprocessor to follow the execution of the fine control mode routine in the next interrupt with an accumulation initialization command routine that has been illustrated in FIG. 10. In the accumulation initialization command routine, selected locations in the servo microprocessor memory in which the sums S1, S2 and S3 are to be accumulated are initialized to zero, step 194, an accumulation count location in the servo microprocessor memory is set to zero, step 196, and a command number that determines the command routine to be executed at the next interrupt is written to a memory location reserved for the command numbers in the servo microprocessor memory, step 198. Consequently, at the next interrupt of the servo microprocessor 60, the servo microprocessor will initially execute the fine control mode routine and then execute the accumulate command routine that has been illustrated by a flow chart in FIG. 11.

At the next interrupt of the servo microprocessor 84, an offset of the servo transducer is calculated, step 199, as in step 156 of FIG. 6 and outputted, step 201, to the servo demodulator 90 to maintain servo track following with the dc offset selected, at step 184, to be a fraction of a track spacing.

As noted above, servo data including the SPE and samples generated by the thermal calibration circuit 96 are inputted to the servo microprocessor 84 at the beginning of each interrupt. Following calculation of the servo offset, the thermal calibration track samples are added to the contents of the memory locations in which the sums S1, S2 and S3 are accumulated, step 200, and the accumulation count is checked, step 202, to determine whether a number of samples equal to the number of servo frames in a servo track has been reached. If not, the accumulation count is incremented, step 204, and the servo microprocessor 84 returns to its main program to await the next interrupt. Once the accumulation count indicates that a number of samples equal to the number of servo frames per servo track have been accumulated, the command register in the servo microprocessor 84 is set to the receive new command command routine, step 206 and the sums are outputted to the communications circuit in the system logic IC 62, step 208, followed by an indication that the accumulation has been completed, step 210. Thereafter, until a new command is received from the system microprocessor 60, the servo microprocessor 84 will execute the fine control mode routine and the receive new command command routine at each interrupt.

Figure 9:
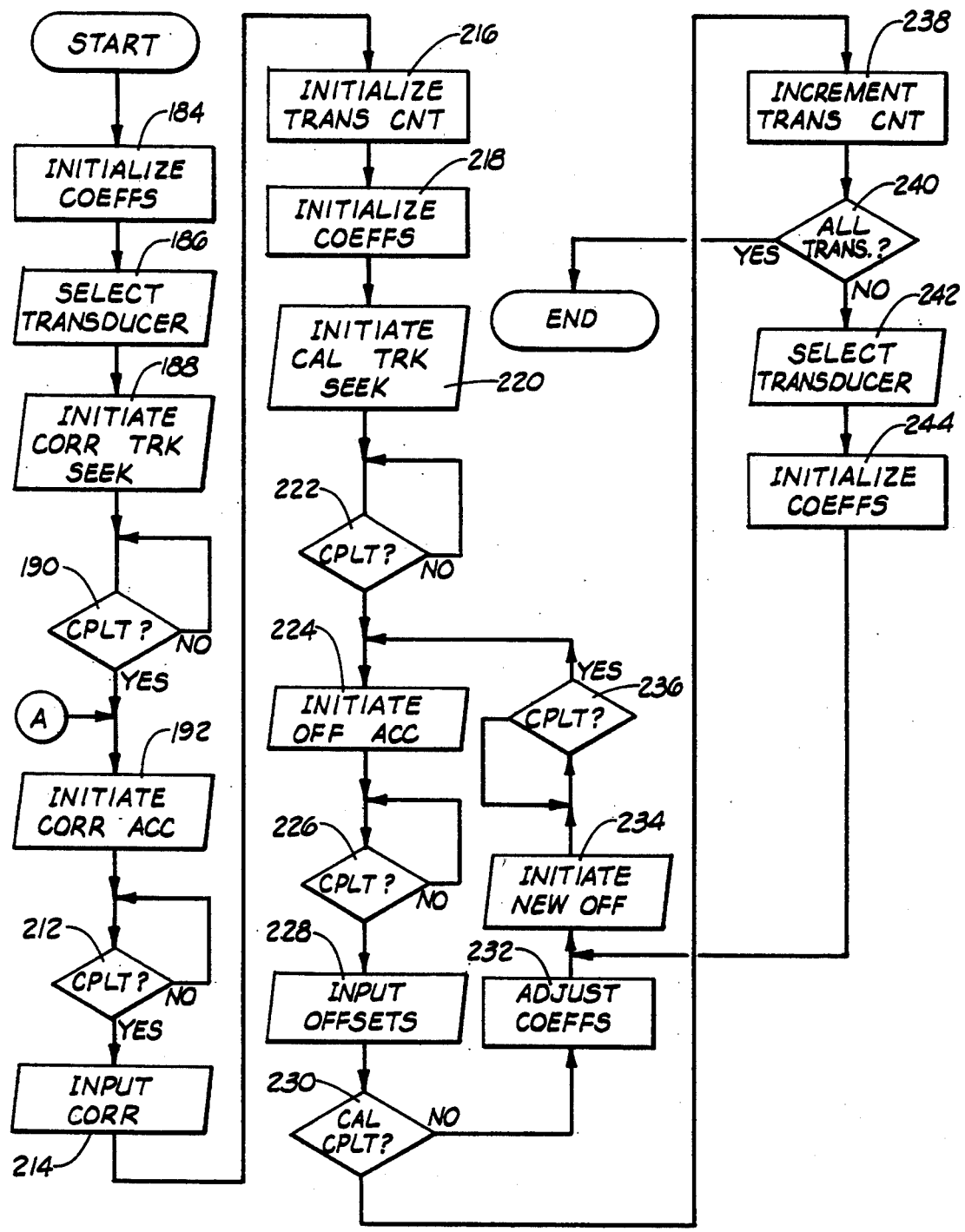
FIG. 9 is a flow chart of the execute thermal calibration routine shown in FIG. 7.
Figures 10, 11:
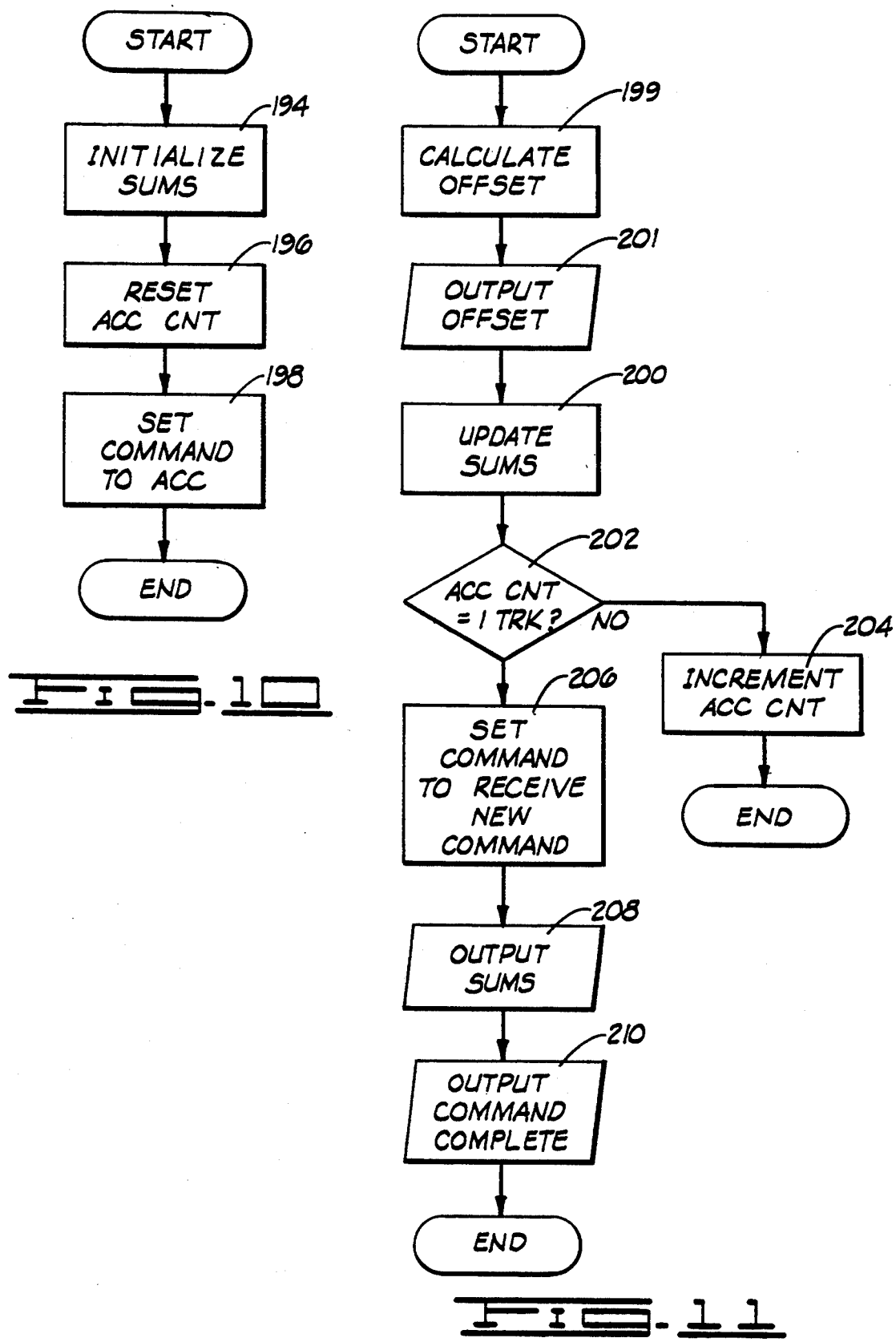
FIG. 10 is a flow chart of the accumulation initialization command routine executed by the servo microprocessor of the disc drive of FIG. 1 in response to an accumulation command received from the system microprocessor.
FIG. 11 is a flow chart of the accumulation command routine executed by the servo microprocessor.

Before continuing with the description of the thermal calibration routine, it will be useful to consider the significance of the sums that are accumulated by the initiation of the correction accumulation; that is, by step 192 of FIG. 9. As noted above, the correction track is merely a series of oppositely magnetized cells that extend in an unbroken circle along the surface 36 of the disc 22; that is, it contains no radius dependent structure. As a result, since the amplitude of signals induced in transducers by passage of magnetization reversals along a track is substantially proportional to the overlap between the transducer and the track, the samples of the correction track that are taken by the thermal calibration circuit 96 at such times that the data transducer 40 is radially aligned with the A burst patterns on the thermal calibration track will have the same amplitudes as the samples taken when the data transducer is radially aligned with the B burst patterns. Thus, in the absence of electronic offsets in the thermal calibration circuit 96, the output of the divider 128 at the time the servo data is inputted at the start of each interrupt (Step 132 of FIG. 4) will be zero. That is, a nonzero sum for the samples of the correction track can only arise from electronic offsets in the thermal calibration circuit. Thus, the sum S1 accumulated in accordance with equation (5) will be a measure of electronic offsets currently existing in components of the thermal calibration circuit 96. The sums S2 and S3 accumulated from sampling of the correction track will be accumulations of sine and cosine terms for a series of equally spaced angles adding to a full circle and will, accordingly, be zero.

Returning to FIG. 9, once the system microprocessor 60 receives the command complete indication from the servo microprocessor 84, step 212, the sum accumulated by sampling the correction track using the thermal calibration circuit 96 are inputted to the system microprocessor, step 214, multiplied by the coefficients of the sums in equations (2) through (4) and stored for use of the sum S1 accumulated during sampling of the correction track as a calibration correction that is used to adjust the dc coefficients of the nominal thermal calibration relations of the prior art that are obtained by sampling the thermal calibration tracks as will be discussed below.

Following measurement and storage of the calibration correction, a transducer count is initialized, step 216, and the coefficients of the thermal calibration relation are again initialized, step 218. Such initialization consists of outputting the contents of the system microprocessor memory location in which the coefficients are stored for the transducer 40 to the system logic IC 62 for transmittal to the servo microprocessor with an ensuing seek command. In the initial execution of the thermal calibration routine 176, the coefficient initialization step 162 in FIG. 7 will cause the coefficients to be zero for the first execution. Thereafter, the coefficients will be coefficients previously determined for the transducer 40. The significance of this point will become clear below. Following coefficient initialization, the servo microprocessor is commanded, at step 220, to seek to the cylinder that contains the thermal calibration tracks on the data surfaces. As a result, the data transducer 40 and servo transducer 74 will move to the positions indicated in FIG. 8C in which, for the first execution of the thermal calibration routine 176, the servo transducer 74 will follow the servo track 73 and the data transducer 40 will generally vary about the thermal calibration track 102 on the disc surface 36 by amounts that reflect changes in the geometry of the transducer and disc stacks since the thermal calibration tracks were written at the time of manufacture of the disc drive 20.

Once the seek has been completed, and detected by the system microprocessor 60 at step 222, the system microprocessor 60 again issues the accumulation command, indicated by the initiate accumulation step 224, to the servo microprocessor 84. Accordingly, the servo microprocessor will again execute the accumulization initialization routine shown in FIG. 10 and then repetitively execute the accumulation routine illustrated in FIG. 11 to again accumulate the sums S1, S2 and S3. However, since the transducers have been shifted to the thermal calibration tracks, the sums will be accumulated from sampling of the A and B burst patterns, 106 and 108 respectively, on the thermal calibration track 102 in FIG. 2. Thus, the values of the sums will reflect both the electronic offsets in the thermal calibration circuit 96 and mechanical offsets between the data transducer 40 and servo transducer 74, the calibration track 102 and the servo track 73, and departures from a parallel relation between the data surface 36 and servo surface 64.

Following completion of the accumulations, step 226, the sums are inputted by the system microprocessor 60, step 228, and multiplied by the factors in equations (2), (3) and (4), to obtain the coefficients of the nominal thermal calibration relation of the prior art; that is, the conventional thermal calibration relation uncorrected for electronic offsets in the thermal calibration circuit 96. The nominal thermal calibration relation is adjusted, by subtracting the calibration correction from the dc component of the nominal thermal calibration relation, and the difference is added to the contents of memory locations in which the coefficients of the corrected thermal calibration relation are stored to obtain a first approximation to the corrected thermal calibration relation for the data surface 36 in accordance with which the servo transducer 74 can be offset from servo tracks to result in track following, without offset by the data transducer 40.

Following such storage, the system microprocessor 60 determines whether the new contribution to the dc component of the corrected thermal calibration relation is less than a selected fraction, suitably 1.5%, of a track spacing, step 230, and, if so, proceeds to thermal calibration for remaining data transducer-data surface combinations.

Since, in the execution of the initial thermal calibration routine, the coefficients of the thermal calibration relation are initialized to zero, the first contribution to the stored coefficients that is obtained will usually exceed the selected fraction of a track. In this case, the coefficients to be outputted to the servo microprocessor are adjusted, step 232, by outputting the newly stored coefficients to the communication circuit in the system logic IC 62, and a new offset command is issued, step 234, to the servo microprocessor 84. Since the servo microprocessor 84 is set to receive new commands at the conclusion of each accumulation command routine, step 206 of FIG. 11, the new offset command will be inputted by the servo microprocessor 84 at the next interrupt thereof. The new offset command routine has been illustrated in FIG. 12 to which attention is now invited.

In the new offsets command routine, the coefficients in the communication circuit of the servo logic IC 62 are inputted, step 237, the command routine to be called at the next interrupt is set to call the receive new command command routine, step 239, and a command complete signal is outputted, step 241, to the communications circuit of the system logic IC 62. Thereafter, the servo microprocessor 84 will calculate offsets of the servo transducer using the new coefficients and output them to the servo demodulator so that the servo transducer 74 will follow a sinuous path with respect to the servo track 73 that will tend to cause alignment of the data transducer 40 with the thermal calibration track 102.

Returning to FIG. 9, once the completion of the new offsets command has been detected by the system microprocessor 60, step 236, the servo microprocessor is again commanded to accumulate the sums S1, S2 and S3 and the sums are again inputted to the system microprocessor 60. As will be clear to those of skill in the art, the new sums will include the electronic offsets in the thermal calibration circuit 96 so that, after multiplication by the factors 1/N, for the sum S1, and 2/N, for the sums S2 and S3, the sums represent amounts that could be added to the stored coefficients to obtain a second approximation to the nominal thermal calibration relation. Thus, a second approximation to the corrected thermal calibration can be obtained by subtracting the calibration correction from the sums, after multiplication by the factors 1/N and 2/N as appropriate, and adding the results to coefficients previously accumulated. Accordingly, after a number of interations, the stored coefficients will converge to the values expressed in equations (2), (3), and (4) to provide a corrected thermal calibration relation that will result in data track following by the data transducer 40 while the servo transducer 74 follows a path is required to maintain alignment between the data transducer 40 and the thermal calibration track 102. The coefficients of this corrected thermal calibration relation are transmitted to the servo microprocessor 84 each time a seek is thereafter made to a track on the data surface 36 for reading or writing of a file so that, during reading and writing of a file from or to a data track on the surface 36, the servo transducer 74 will follow a sinuous path that will cause alignment between the data transducer 40 and the track to which a file is stored on the surface 36.

Before continuing with the description of FIG. 9, it will be useful to consider several points concerning the generation of the corrected thermal calibration relation for the data transducer 40 and the thermal calibration track 102. As noted above, in the initialization of coefficients step 184 prior to reading the correction track, it is preferable to offset the servo transducer 74 from the servo track 72. Such offset will cause the data transducer to follow the correction track with an offset so that the calibration correction is determined while the data transducer 40 reads only a portion of the correction track to one side of the track center line. Such offset is utilized to cause samples taken by the thermal calibration circuit 96 to have amplitudes that are similar to amplitudes of samples taken during following of the thermal calibration track 102. More particularly, since the A and B burst patterns 106 and 108 respectively are written to the sides of the thermal calibration tracks, the data transducer 40 will sample only portions of such patterns as the thermal calibration for the data transducer 40 nears completion and the data transducer 40 follows the thermal calibration track without offset. Thus, offsetting the data transducer 40 from the correction track during accumulation of the calibration correction eliminates the effect of nonlinearities that might exist in the thermal calibration circuit 96. A suitable offset from the correction track is approximately 40% of a track spacing.

A second point is that the coefficients of the thermal calibration relation transmitted to the servo microprocessor 84 at step 216 prior to movement of the servo transducer 74 to the track 73 in the cylinder containing the thermal calibration track 102 are initialized, at step 216, to the contents of the system microprocessor memory locations at which the coefficients of the corrected thermal calibration relation for the transducer 40 are stored. By use of previously determined coefficients in the execution of succeeding executions of the thermal calibration routine, the iterative procedure described above for the measurement of the coefficients can be caused to converge more rapidly to the proper values.

A third point is that, since the geometry of the disc and actuator stacks will generally vary from one execution of the thermal calibration routine to the next, track following by the servo transducer 74 during measurement of the correction track, steps 184 through 214 of FIG. 7, during subsequent execution of the thermal calibration routine will generally result in the data transducer 40 following a sinuous path with respect to the correction track 166. However, if such path does not depart greatly from the centerline of the correction track, the sinuous shape of the path the transducer 40 traces on the data surface 36 will have no effect on the determination of the calibration correction. The correction track 166 is merely a circle of magnetized cells having no radial structure. Thus, small changes in the mechanical offsets that occur between sampling of portions of the correction track aligned with the A burst patterns and sampling of portions of the correction track aligned with the B burst patterns will average to zero by the summing of a number of samples equal to the number of servo frames per track. Hence, even though the correction track may become misaligned with the servo track 72 and the relative alignment of the servo transducer 74 and the data transducer 40 may change between executions of the thermal calibration routine, the sum S1 determined by sampling the thermal calibration track will always be a measure of the electronics offsets in the thermal calibration circuit 96 when the thermal calibration routine is executed at relatively short time intervals.

Referring once again to FIG. 9, once the corrected thermal calibration relation has been obtained for the transducer 40, the corrected thermal calibration relation is obtained for the remaining data transducers by incrementing the transducer count, step 238, checking to determine whether the count is equal to the number of data transducers the disc drive 20 comprises, step 240, and, if not, selecting a new transducer for calibration, step 242. Such selection is made by transmitting signals to the transducer select logic 58 that will cause pulses induced in the newly selected data transducer to appear on the signal path 98 of FIG. 1 for transmission to the thermal calibration circuit 96. Coefficients of the thermal calibration relation for the newly selected data transducer are then selected in accordance with the same criteria discussed above for the data transducer 40 and the coefficients are outputted to the communications circuit of the system logic IC 62 to initialize the coefficients, step 244, for the newly selected data transducer to be calibrated. The program then issues the new offset command at step 232 to the servo microprocessor 84 to enter the iterative loop described above for the transducer 40 to iteratively determine the corrected thermal calibration relation for the newly selected data transducer. Once all data transducers have been calibrated, the thermal calibration routine returns to the main program illustrated in FIG. 7.

FIGS. 13 and 14 are flow charts of a modified main program of the system microprocessor 60 and a modified thermal calibration routine that permit recalibration at intervals that are separated in time sufficiently that mechanical factors might introduce inaccuracies in the measurement of the electronic offsets. In the system microprocessor main program contemplated by the flow chart of FIG. 13, the buffer is loaded, step 246, as described above for step 160 of the unmodified program but is not followed by the steps 162 through 172 shown in FIG. 7. Thus, no writing of the correction track, step 172 in FIG. 7, occurs in the system microprocessor main program illustrated in FIG. 13. Instead, the system microprocessor immediately executes, step 248, the modified thermal calibration routine shown in FIG. 14.

In the modified thermal calibration routine, the thermal calibration coefficients are initialized, step 250, as described in the step 162 of FIG. 7, so that an ensuing seek command will cause the servo transducer 74 to be moved to the servo track 72 in the cylinder which is to contain the correction track 102 and to follow such track without offset. Similarly, the transducer 40 is selected for writing, step 252, as described for step 164 of FIG. 7. The system microprocessor 60 then issues a seek command, step 254, to the cylinder that is to contain the correction track; that is, to the servo track 72, in the same manner that such a seek is commanded in the system microprocessor main program at step 168 in FIG. 7.

When the seek has been completed, step 256, the system microprocessor 60 issues commands to the interface controller 52 and the system logic IC 62 that will cause writing of the correction track, step 258. Thus, the correction track will be written every time the thermal calibration routine is executed.

The servo transducer is then offset from the servo track 72 by the selected fraction selected for reading the correction track, step 260, by issuance of a new offset command, with said fraction outputted to the communication circuit as the dc coefficient of the thermal calibration relation, so that the servo microprocessor 64 will execute the new offsets command routine illustrated in FIG. 12. Following the execution of the new offset command the servo transducer 74 will follow the servo track 72 with the selected offset so that the disc drive will be in the same state that it is in just prior to the issuance of the accumulate command that is issued at step 192 of FIG. 9 to initiate accumulation of the calibration correction; that is, just prior to the sampling of the correction track that takes place in initial step of the unmodified thermal calibration routine. Thus, by following the steps of the unmodified thermal calibration routine beginning with the correction accumulation at step 192 of FIG. 9, the disc drive will determine the coefficients of the corrected thermal calibration relations in exactly the same manner that has been described above with respect to steps 192 through 244 of FIG. 9 and the flow charts of FIGS. 10 through 12. Accordingly, once the step 260 has been completed, step 262, the remainder of the modified thermal calibration routine is executed in exactly the same manner that has been described above beginning with the correction accumulation step 192 as indicated by the program connection point A in FIGS. 14 and 9.

Returning to FIG. 13, once the thermal calibration routine at step 248 has been completed, a timer is started, step 264, for the next execution of the thermal calibration routine, and the system microprocessor 60 enters a loop in which the system microprocessor repetitively checks the timer, step 266, and processes read/write operations, step 368 as in steps 180 and 182 of FIG. 7.

When the time for execution of a new thermal calibration routine has expired, the system microprocessor 60 main program, in one variation indicated by the solid line 270 in FIG. 13, returns to the load buffer step 246 and repeats the portions of the main program illustrated in FIG. 13 including the thermal calibration routine called at step 248.

However, as indicated by the dashed line 272, the load buffer step may be omitted when the thermal calibration routine is repeated. Inclusion of the load buffer step 246 will cause the correction track to be written with a constant density that will insure that samples of the correction track will each be comprised of the same number of emf pulses from the data transducer 40. Hence, the repetition of the step insures that the output of the divider 128 will indeed be representative of electronic offsets in the components of the thermal calibration circuit 96.

However, loading the buffer 54 each time the thermal calibration routine is executed will also cause the loss of data that may have been read from a disc surface in anticipation of a request for that data from the host 50. Since such loss can be eliminated by formatting the correction track with whatever data may currently be stored in the buffer 54 and since the frequency with which data is written to the discs at the location of the correction track, near the outside edge of the disc 22, will often suffice to ensure the reception of a number of emf pulses by the thermal calibration circuit 96 even at maximum spacing of data bits consistent with the data encoding scheme utilized for the disc drive 20, the load buffer step 246 will in most cases be eliminated in the execution of thermal calibration routines executed subsequent to the first execution.

Once the corrected thermal calibration relations have been obtained, data track following by a selected data transducer, without offset, during writing or reading a file by the selected transducer; that is, during the prosecution of read/write operations at steps 182 and 268 of FIGS. 7 and 13 respectively, is effected by outputting the coefficients stored for the selected transducer to the servo microprocessor 84 with a command to seek to the data track that is selected to receive the file. Since, as described above, the seek ends with the servo microprocessor executing the fine control mode routine and the receive new command command routine illustrated in FIGS. 5 and 6 respectively, offsets of the servo transducer 74 required to align the selected data transducer with data tracks on the data surface proximate the selected data transducer will be calculated at step 156 of the receive new command command routine and outputted to the servo demodulator 90 during each interrupt of the servo microprocessor. More particularly, the servo offset calculated during each interrupt is the offset that will cause the SPE measured during the next interrupt to reflect the location of the selected data transducer with respect to the selected data track. Hence, the actuator correction calculated at step 144 of the fine control mode routine and outputted to the servo logic IC 78 at step 146 will be the actuator correction required to cause the selected data transducer to follow the selected data track on the data surface proximate the selected data transducer.

Should the file be stored on a number of data surfaces, as is often the case, the system microprocessor 60 temporarily discontinues the transfer of the file while a change from one data surface to the next is made. In particular, the system microprocessor outputs the coefficients of the corrected calibration relation for the new data surface to the communications circuit of the system logic IC 62 and issues the new offset command that is implemented as described above with respect to FIG. 12. Storage or retrieval of the file is then resumed when the system microprocessor 60 receives a command complete indication from the servo microprocessor via the communications circuit as has been described above.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for positioning data transducers with respect to data tracks on data surfaces of a plurality of rotating discs of a disc drive of the type wherein the data transducers are supported proximately to the data surfaces by a common actuator; wherein the data tracks are organized into concentric cylinders each including a servo track defined by a servo pattern prerecorded on a dedicated servo surface of one of said discs; wherein the disc drive is further characterized as being of the type comprising:

servo means, including a servo transducer supported on said actuator proximate the dedicated servo surface, for periodically sampling the servo pattern and repositioning the actuator in relation to the location of the servo transducer with respect to a selected servo track; and thermal calibration means, electrically connectable to selectable data transducers, for periodically sampling data written to the data tracks; and wherein the data tracks on each data surface include a prerecorded calibration track written in a radially asymmetric pattern about the calibration track center, comprising the steps of:

(a) during start-up of the disc drive, writing a correction track to one of the data surfaces while positioning the servo transducer to follow a selected servo track;

(b) periodically sampling said correction track using the thermal calibration means while positioning the servo transducer with respect to said selected servo track to generate a calibration correction indicative of electronic offsets in the thermal calibration means;

(c) sampling the calibration tracks on each of the data surfaces while positioning the servo transducer with respect to the servo track in the same cylinder as the calibration tracks to generate for each data surface a nominal thermal calibration relation indicative of mechanical offsets between the data and servo tracks and transducers combined with the electronic offsets in the thermal calibration means;

(d) adjusting each of the nominal thermal calibration relations by an amount equal to said calibration correction to obtain for each data surface a corrected thermal calibration relation indicative of mechanical offsets between the servo and data tracks and transducers; and (e) for at least a time thereafter during the operation of the disc drive, positioning the data transducers with respect to data tracks during reading and writing of data to a selected data track on a selected data surface by repetitively positioning the servo transducer in an offset relation from the servo track in the cylinder which contains the selected data track in accordance with the corrected thermal calibration relation determined for the selected data surface.

2. The method of claim 1 wherein the step of periodically sampling the correction track while positioning the servo transducer with respect to a selected servo track is further characterized as sampling the correction track while repetitively positioning the servo transducer in a selected offset relation to the selected servo track.

3. The method of claim 1 further comprising the steps of repeating steps (a) through (e) from time to time.

4. The method claim 1 further comprising the steps of repeating step (b) through (e) from time to time.

* * * * *